No. 833,711. PATENTED OCT. 16, 1906.
G. FUCHS.
LAMP BURNER FOR LIGHTING AND HEATING PURPOSES.
APPLICATION FILED JUNE 29, 1904.
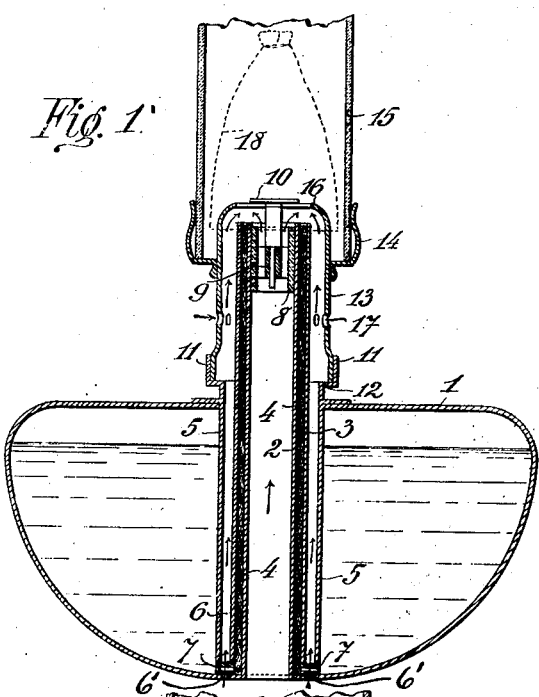
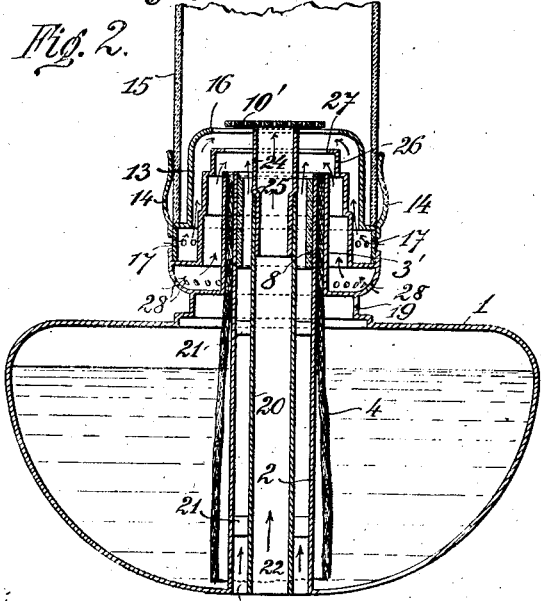

UNITED STATES PATENT OFFICE.

GUSTAV FUCHS, OF VIENNA, AUSTRIA-HUNGARY.

LAMP-BURNER FOR LIGHTING AND HEATING PURPOSES.

No. 833,711.  Specification of Letters Patent.  Patented Oct. 16, 1906.

Application filed June 29, 1904. Serial No. 214,620.

*To all whom it may concern:*

Be it known that I, GUSTAV FUCHS, manufacturer, a subject of the Emperor of Austria-Hungary, and a resident of 15 Amerlingstrasse, in the city of Vienna, Province of Lower Austria, and Empire of Austria-Hungary, have invented certain new and useful Improvements in Lamp-Burners for Lighting and Heating Purposes, of which the following is a specification.

This invention relates to lamps with circular wicks for burning hydrocarbons, spirit, and other gas-forming fluids for lighting or heating purposes.

The object of the invention is to provide such lamps with burners which permit of a rapid current of air which keeps the wick cool and which is thoroughly mixed with the gases formed in the burner.

A further object of the invention is to provide such burners in which the gases are developed only in the quantity required, so that a Bunsen flame of high heating effect is formed, which may be used advantageously for heating purposes or with incandescent mantles for lighting purposes.

The invention will be hereinafter more fully described and explained, with reference to the accompanying drawings, in which—

Figure 1 is a vertical cross-section of a lamp and burner constructed according to the invention, and Fig. 2 is a vertical cross-section of a modified form of the lamp and burner.

Referring more particularly to Fig. 1, the lamp-font 1 has inserted in its center two concentric tubes 2 and 3, secured to the bottom of the font 1 and carrying in the annular space between them the circular wick 4. A further tube 5 in the font 1 surrounds the said tubes 2 and 3 and forms an annular space 6 around the outer tube 3. The central tube 2 and the annular space 6 are open at the bottom of the font 1. The annular space forming the wick-tube is connected at its lower end with the space of the font by means of the small radial tubes 7. On the upper end of the inner tube 2 is inserted a short tube 8, made of a material non-conductor of heat and supporting, by means of central arms 9, the horizontal disk or button 10. The font 1 has secured to its upper part and extending above the tube 5 a cylindrical part 11, supporting on a corresponding shoulder 12 the tube 13, which is provided with the gallery 14 for the chimney 15. The upper edge 16 of said tube 13 is bent inward toward the rim of the disk or button, and in its lower part said tube 13 is provided with air-holes 17. The incandescent mantle 18 (indicated in dotted lines) is supported in any well-known or usual manner. As shown by the several arrows, the air gains access to the flame through the central tube 2, the annular space 6, and the perforations 17 of tube 13, thereby cooling the wick-tube 2 3 from both sides, and is at the upper end of the burner thoroughly mixed with the gases developed at the upper end of the wick. The insulating-tube 8 prevents the wick-tube being heated too much.

The other form of the lamp and burner shown in Fig. 2 has inserted in the lamp-font 1 a double wick-tube, the inner tube 2 of which extends down to the bottom of the font, while the outer tube 3' extends only a certain distance down from the top, so that the wick 4 hangs freely in the basin with its lower part. The inner tube 2 is connected with the bottom of the font, and the outer tube 3' is cast in one piece or otherwise-connected with the top part 19 of the font. On the top of the inner wick-tube 2 is inserted the short insulating-tube 8 in the same manner as in Fig. 1. The said inner wick-tube 2 has inserted and held by means of elastic arms 21 a central tube 20, extending down to the opening in the bottom of the font, thus forming two central air-passages 22 and 23 on the inner side of the wick-tube. On the upper edge of said central tube 20 is inserted and seated with a shoulder 25 the tube 24, supporting on its upper end the disk 10', which in the present case is perforated. The top part 19 of the lamp-font 1 extends in a cone or bell shaped part 26, surrounding the wick-tube and having its upper edge 27 bent against and lying beneath the disk or button 10'. Part 19 supports the tube 13 with gallery 14 and chimney 15. The tube 13 surrounds the cone 26. It is provided with air-holes 17, and its upper edge 16 is bent inward toward the disk 10'. The top part 19 of the font is also provided with air-holes 28.

The arrangement described creates two inner and two outer currents of air, as indicated by the arrows in Fig. 2. The current of air entering through the annular space 23 and that passing on the inside of cone 26 serves to cool the wick-tube in its upper part from both sides and are below the edge 27 of the cone 26 thoroughly mixed with the gases developed on the top of the wick. Then the outer current of air passing through the holes 17 and under the edge 16 of tube 13 meets the gases, and finally the current of air entering through the central space 22 passes through the perforations of the disk 10' to the central part of the flame.

In both forms of my lamp and burner the currents of air on the inside and outside of the wick-tube and the insulating-tube on the top of said wick-tube prevent the wick-tube becoming heated too much, and also the gases are developed only in the quantity required to form an efficacious Bunsen flame. The development of gases is perfectly regulated by raising or lowering the wick by means of any suitable device, so that sooting of the lamp and deterioration of the air in the room caused by too-rapid development of gases may be easily prevented. On screwing the wick wholly down for extinguishing the flame no more gases are developed.

Having now described my invention, what I claim, and desire to secure by Letters Patent of the United States, is—

The combination with a font, of two centrally-arranged concentric tubes 2 and 3 secured to the font and forming between them an annular space for the wick, a tube 5 within the font and surrounding the first-mentioned two tubes and forming an annular space 6 around the outer one of said latter tubes, the said font being provided in its bottom with openings 6' to permit air to gain access to the space 6 at the lower end of the latter, small radial tubes 7 connecting the lower end of the wick-space with the interior of the font, a short tube of heat-non-conducting material carried by the tube 2, arms attached to the said short tube and a disk carried by said arms.

In testimony whereof I have signed my name in presence of two subscribing witnesses.

GUSTAV FUCHS.

Witnesses:
S. Freih. Fuchs,
Alvesto S. Hogue.